Jan. 16, 1945. J. J. HEIGL 2,367,350
ACID TREATING WELL
Filed Dec. 13, 1941
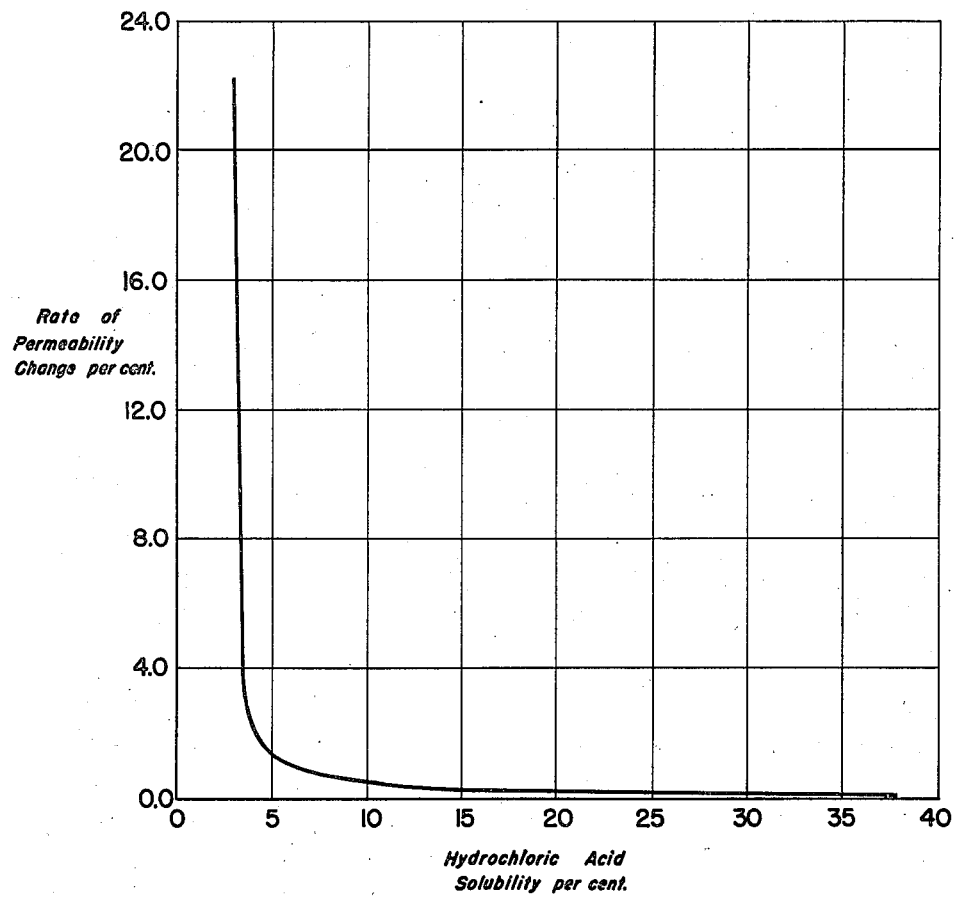
John J. Heigl INVENTOR.
BY J. G. McKean
ATTORNEY

UNITED STATES PATENT OFFICE 2,367,350

ACID TREATING WELLS

John J. Heigl, Tulsa, Okla., assignor to Standard Oil Development Company, a corporation of Delaware Application December 13, 1941, Serial No. 422,846

1 Claim. (Cl. 166—25)

The present invention is directed to a method of acid treating wells.

It is an object of the present invention to treat silicate bearing formations with hydrofluoric acid to increase the production of the formations.

It is another object of the present invention to employ both hydrochloric and hydrofluoric acid in treating wells in order to obtain improved results.

Further objects and advantages of the present invention may be seen from a reading of the following description taken with the single figure of the drawing.

In the production of petroleum it often happens that the major portion of the producing formations are silicates. It is generally known to the art that the production of wells may be increased by increasing the permeability of the formations adjacent the bore hole, and it is well known to treat limestones and carbonates with hydrochloric acid to increase the permeability of such formations. In the treatment of silicate bearing producing formations to increase their permeability considerable difficulty has been encountered. On some occasions the treatment of silicate bearing producing formations with hydrofluoric acid has resulted in the production of gelatinous precipitates which plugged the formations and decreased the productive capacity of the formations rather than increased it.

It has been discovered that the carbonate content of silicate formations must be maintained below a certain point in order that the silicate bearing formations may be satisfactorily treated with hydrofluoric acid. Generally speaking, the carbonate content of the formation must be no greater than 10% in order to eliminate the formation of precipitates which otherwise would be produced by the reaction of hydrofluoric acid on carbonates.

The improvement in the permeability of a formation containing both silicates and carbonates when treated in accordance with the present invention will be readily grasped upon consideration of the drawing which is in the form of a curve. In the drawing the rate of permeability change when treating formations with hydrofluoric acid is plotted as an ordinate, and the hydrochloric acid solubility of formations plotted as the abscissa; as shown in the drawing, the curve resembles a hyperbola. The rate of improvement, when treating a formation having a hydrochloric acid solubility as great as 30%, is almost zero and gradually increases with decreasing hydrochloric acid solubility. The rate of improvement becomes only appreciable at about 10% hydrochloric acid solubility. However, at this point, the rate change becomes very rapid so that when the hydrochloric acid solubility is reduced to a value between 3% and 4% the curve becomes almost an asymptote.

The process of the present invention may be generally carried out by either of two methods. As a first method the formation may be treated with hydrochloric acid. The reaction between the acid and the carbonate are allowed to proceed to the desired point and the hydrochloric acid is then displaced by hydrofluoric acid.

The second method involves the preliminary treatment of the formation with hydrochloric acid and the gradual replacement of the hydrochloric acid by hydrofluoric acid so that there will be a subsequent stage in which both the hydrofluoric and hydrochloric acids are present in appreciable amounts and reacting on the formation. In this method, the hydrochloric acid may be gradually displaced until substantially pure hydrofluoric acid is present in the formation, or, if desired, the added acid may at all times contain substantial amounts of hydrochloric acid in addition to the hydrofluoric acid.

It has been found generally desirable to use a hydrochloric acid of no greater concentration than 15% and hydrofluoric acid of no greater concentration than 30% in carrying out the present invention. It has also been found desirable to employ inhibitors in the acids.

Well known corrosion inhibitors may be employed in the hydrochloric acid to prevent the corrosion of the equipment used in placing the acid in the well and suitable inhibitors also may be employed in conjunction with the hydrofluoric acid. Examples of corrosion inhibitors suitable for this purpose are such compounds as quinoline, ethiodide and pyridine. It may also be desirable to employ a gel or gelation preventing agent with the hydrofluoric acid employed in treating the silicate containing formations. It often happens in the reaction of silicate formations with hydrofluoric acid that hydrosilicic acid or silicic acid is formed and is deposited as a gel within the formation. Such a gel deposit is obviously undesirable as it tends to reduce rather than increase the permeability of the formation. To prevent the throwing down of a gel or gelatinous precipitate within the formation small amounts of agents, such as phosphoric acid or sodium acid pyrophosphate, may be added to the hydrofluoric acid used for treating the formations.

It will be understood that generally, when acidizing formations and employing hydrofluoric acid or a mixture of hydrofluoric acid with another acid, it is desired to penetrate only sand containing oil and gas, and not that part of the formation which contains water. In order to prevent the reaction of hydrofluoric acid with water bearing sand underlying the oil and gas producing sand, a layer of calcium fluoride may be placed in the bore hole opposite the water bearing sand and allowed to remain there while formations above this seal are being treated with hydrofluoric acid, or mixtures of hydrofluoric with other acids.

Under some conditions, when treating bore holes with hydrofluoric acid, or mixtures of hydrofluoric with other acids, it will be desirable to increase the rate of reaction of the acid. A convenient way to obtain the increased rate of reaction is by placing metallic aluminum in the well bore so that it will be in contact with the acid utilized for treating the well. A portion of the acid injected into the well will react with the aluminum, and the heat produced by this reaction will raise the temperature of the remaining acid in the bore hole.

It will be understood that, although I have disclosed the use of hydrofluoric acid and hydrofluoric acid mixtures for treating the bore hole involving the simple placement of the acids in the bore hole adjacent selected formations, other methods of utilizing the acid may be employed. For example, a jet may be arranged within the well bore with the end of the jet adjacent the formation to be acid treated and the hydrofluoric acid or acid mixtures forced through the jet so that it will impinge upon the formation at a high velocity. The jet may be arranged to point in a generally downward direction, and the hydrofluoric acid or hydrofluoric acid mixtures employed to remove cemented sand formations and deepen the bore hole.

On some occasions, particularly when it is desired to increase the productivity of a sand formation, it will be desirable to employ a horizontally arranged jet and direct hydrofluoric acid by means of the jet against the walls of the bore hole. This procedure has been found particularly advantageous for opening a channel or channels through which the oil can flow into the bore hole, and thereby reduce the pressure differentials in the vicinity of the well bore.

While I have disclosed specific embodiments of the present invention, it will be obvious to a skilled worker that various changes may be made without departing from the scope of the invention, and it is my intention to embrace such changes in the hereto appended claim.

I claim:

A method of treating a fluid-producing formation penetrated by a borehole, said formation comprising carbonates substantially in excess of 4% and a substantial amount of silicates, including the steps of preliminarily treating said formation with hydrochloric acid to reduce the carbonate content of the formation adjacent the well bore to below 4% of the undissolved formation, and subsequently introducing hydrofluoric acid into the preliminarily treated portion of the formation and dissolving silicate from said portion of the formation.

JOHN J. HEIGL.